United States Patent [19]

Noguchi et al.

[11] 4,200,552
[45] Apr. 29, 1980

[54] CATALYST CARRIER, CATALYST AND THEIR MANUFACTURING PROCESS

[75] Inventors: Masaaki Noguchi, Nagoya; Tsuchio Bunda, Okazaki; Noboru Yamamoto; Shigeo Soejima, both of Nagoya, all of Japan

[73] Assignees: Toyota Jidosha Kogyo Kabushiki Kaisha, Toyota; NGK Insulators, Ltd., Nagoya, both of Japan

[21] Appl. No.: 2,770

[22] Filed: Jan. 11, 1979

Related U.S. Application Data

[63] Continuation of Ser. No. 837,920, Sep. 29, 1977, abandoned.

[30] Foreign Application Priority Data

Oct. 6, 1976 [JP] Japan .................................. 51-120196

[51] Int. Cl.² ........................ B01J 21/04; B01J 21/12; B01J 23/40

[52] U.S. Cl. ................................ 252/466 PT; 252/455 R; 252/463; 423/213.2; 423/213.5

[58] Field of Search .............. 252/455 R, 463, 466 PT; 423/213.2, 213.5

[56] References Cited

U.S. PATENT DOCUMENTS

| | | | |
|---|---|---|---|
| 3,565,830 | 2/1971 | Keith et al. | 423/213.5 |
| 3,839,224 | 10/1974 | Yonehara et al. | 252/477 R |
| 3,881,696 | 5/1975 | Lepeytre et al. | 252/466 B |

*Primary Examiner*—W. J. Shine
*Attorney, Agent, or Firm*—Brisebois & Kruger

[57] ABSTRACT

A porous catalyst carrier refractory material with its pores containing internally deposited active alumina, its total pore volume being 0.05–0.50 cc/g, its average pore diameter 0.05–5.0μ and its specific surface area 3–60 m²/g and a method of making it.

12 Claims, 6 Drawing Figures

CATALYST CARRIER, CATALYST AND THEIR MANUFACTURING PROCESS

This is a continuation of application Ser. No. 837,920 filed Sept. 29, 1977, now abandoned.

BACKGROUND OF THE INVENTION

Usually it is extremely difficult for the catalyst carrier and the catalyst used to purify the auto exhaust gas to display its purifying performance, catalyst durability and mechanical strength fully in response to the changing conditions of engine operation such as the composition, density, volume, temperature of exhaust gas or shock and vibration. Especially in the case of a conventional catalyst, as illustrated by B in FIG. 1, which is carried by transition alumina such as γ-alumina, with an increase in the distance run the catalyst comes to be contaminated with a particular element of the exhaust gas or to be deteriorated through hysteresis, thereby decreasing steadily in its purifying performance. Moreover, the catalyst particles, which have a low mechanical strength, are liable to be broken and reduced to powder by vibration and shock of the vehicle, which also leads to a deterioration of the purifying performance. Meanwhile, the broken powder blocks the passage, thereby decreasing the output or a drop in the catalyst volume due to thermal contraction is liable to form an exhaust gas passage which is not related to the purifying reaction, thereby greatly reducing the catalyst durability.

Thus the conventional catalyst carrier which is mainly composed of transition alumina like γ-alumina has the drawback that, since the transition alumina crystallizes at around 900° C. and in consequence turns mechanically very weak, the catalyst carrier is broken with the result of the catalyst characteristic heavily deteriorating on account of vehicle vibration or thermal shock, because the mechanical strength of the transition alumina drops due to hysteresis when exposed to an auto exhaust gas of around 1000° C.

Further in the case of a catalyst carrier made of transition alumina, which has a remarkably high value of specific surface area, but an extremely low value of pore volume, especially of average pore diameter, the auto exhaust gas with an extremely high space velocity suffers extremely little catalyst reaction within the carrier, the reaction predominantly taking place near the surface of the catalyst.

Figure 1:
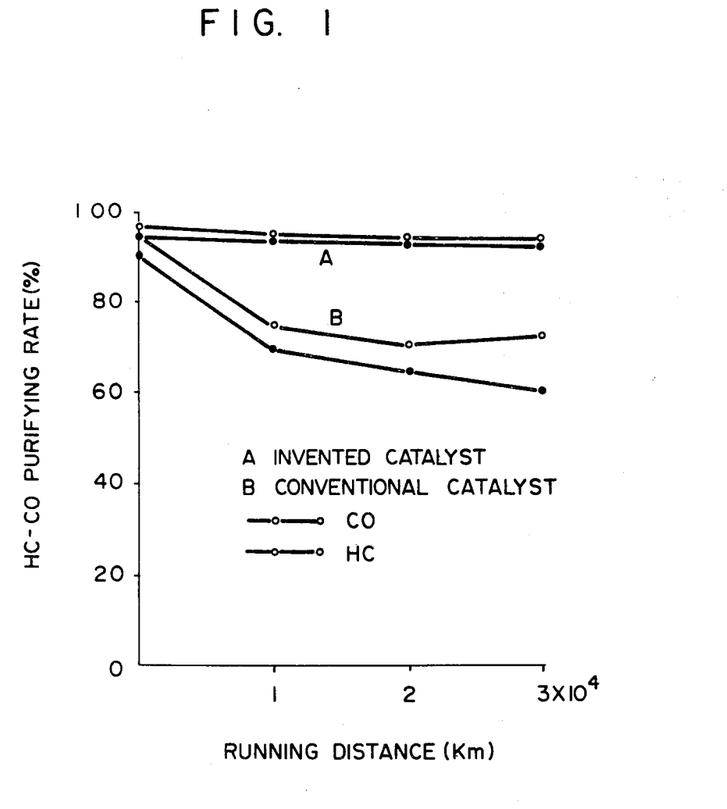
FIG. 1 shows the relation of the purifying rate of HC and CO in the exhaust gas with the distance run in comparison between the conventional catalyst and the one of the present invention.

Therefore the catalyst is contaminated with surface deposits of specific elements in the exhaust gas, i.e., fuel and lubricant additives contained in the exhaust gas or inclusions such as phosphor or lead compounds or the combustion product of sulfur and in consequence the characteristic and durability of catalyst sharply drop as illustrated by B in FIG. 1. Thus the catalyst carrier of transition alumina has been found not always satisfactory for purifying the auto exhaust gas. This fact disproves the validity of the traditional conception that a catalyst carrier having fine pores and accordingly a large specific surface area gives the best performance in purifying the auto exhaust gas.

For the purpose of enhancing the reactivity of a catalyst carrier exposed to a reactive fluid with a high space velocity such as the auto exhaust gas, it is therefore necessary to make the reactive fluid rapidly diffuse on the internal surface of pores near the outer surface of the carrier; and to this end it is necessary to increase the average pore diameter and thereby increase the velocity of diffusion within the pores.

As the materials likely to meet this requirement, refractories with a larger average pore diameter than that of conventional transition alumina such as α-alumina, zircon, cordierite, mullite are conceivable, but they are found unavailable, because on account of their low specific surface area they are inferior in purifying characteristic, notably in the initial rate of purification, though they satisfy the conditions such as mechanical strength, heat resistance and average pore diameter. Thus with nothing ideal available for auto exhaust gas purification the demand has been strong for development of an excellent catalyst carrier and catalyst which are ideal from an anti-pollution point of view.

SUMMARY OF THE INVENTION

The first object of the present invention is to provide a catalyst carrier and a catalyst with high durability, high resistance to thermal shock and high mechanical strength which can be obtained by depositing the internal surface of pores in a high-strength porous carrier material with an active alumina which is capable of giving full play to the catalyst activity.

The second object of the present invention is to provide a catalyst carrier and a catalyst excellent in purifying performance and free from contamination which are obtained by giving specific values of total pore volume, average pore diameter and specific surface area to said catalyst carrier.

The third object of the present invention is to provide a catalyst carrier and a catalyst which can exhibit excellent performance, high mechanical strength and high catalyst durability in purification of auto exhaust gas.

The fourth object of the present invention is to provide the manufacturing processes of said catalyst carrier and catalyst.

DETAILED ACCOUNT OF THE INVENTION

The catalyst carrier and catalyst according to the present invention, as described above, are free from the above-mentioned drawback and suitable for purification of auto exhaust gas. After strenuous research, the optimum values of total pore volume, average pore diameter and specific surface area for catalyst carrier have been found. Namely these are a catalyst carrier which consists of a porous refractory material such as α-alumina, zircon, mullite or cordierite, preferably in particle form with higher density of pores in the core than near the surface, and has the internal surface of pores deposited with active alumina, its total pore volume being 0.05-0.50 cc/g, its average pore diameter 0.05-5.0 μ and its specific surface area 3-60 m²/g, and a catalyst for auto exhaust gas purification, i.e., a precious metal of the platinum family or such metal as copper, nickel, cobalt or manganese carried by said catalyst carrier.

The catalyst carrier and catalyst according to the present invention are notably characterized in that the base material of the catalyst carrier is a mechanically strong, highly heat resistant refractory with a large average pore diameter which has a double structure with deposition of an active alumina of large specific surface area on the internal surface of pore; and through the multiple effect of optimized total pore volume, average pore diameter and specific surface area, an unprecedentedly high performance of auto exhaust gas purification is attained.

The catalyst according to the present invention is obtained by crushing to a specified particle size such material as α-alumina, zircon, mullite or cordierite or such compound which produces such a substance when fired; adding as the sintering agent to preferably more than 80% of such material less than 20% in total of at least one from among $SiO_2$, $TiO_2$, $ZrO_2$, CaO, MgO, $B_2O_3$, $MnO_2$, $Cr_2O_3$ and CuO; mixing it with a common organic binder such as starch, polyvinylalcohol or water-soluble cellulose; drying and turning the resultant slurry into highly fluid granules in a spray drier; and then molding these granules to a desired shape and size in a press or in an extruding machine. The molded product after it is dried is fired at 1000°-1650° C., thereby yielding a porous refractory carrier. The average pore diameter and the total pore volume of the carrier material are set at specified values or somewhat larger values through control of the particle size of material, the kind and added volume of the sintering agent and the firing conditions.

The carrier material thus obtained is dipped in an aqueous solution of aluminum salt, the process of dipping and drying being repeated until the specific surface area falls into a specified range of values. Post-heat treatment ensues and after deposition of active alumina on the internal surface of pores, the catalyst carrier according to the present invention is obtained. The catayst for auto exhaust gas purification according to the present invention is obtained by causing a catalyst to be carried by, say, immersion method, by said catalyst carrier. As a material yielding alumina, any compounds, such as aluminum salts as aluminum nitrate or aluminum hydroxide, which is water-soluble or water-dispersible compound and at the same time gives alumina by heat treatment, is applicable for this purpose.

Figure 2:
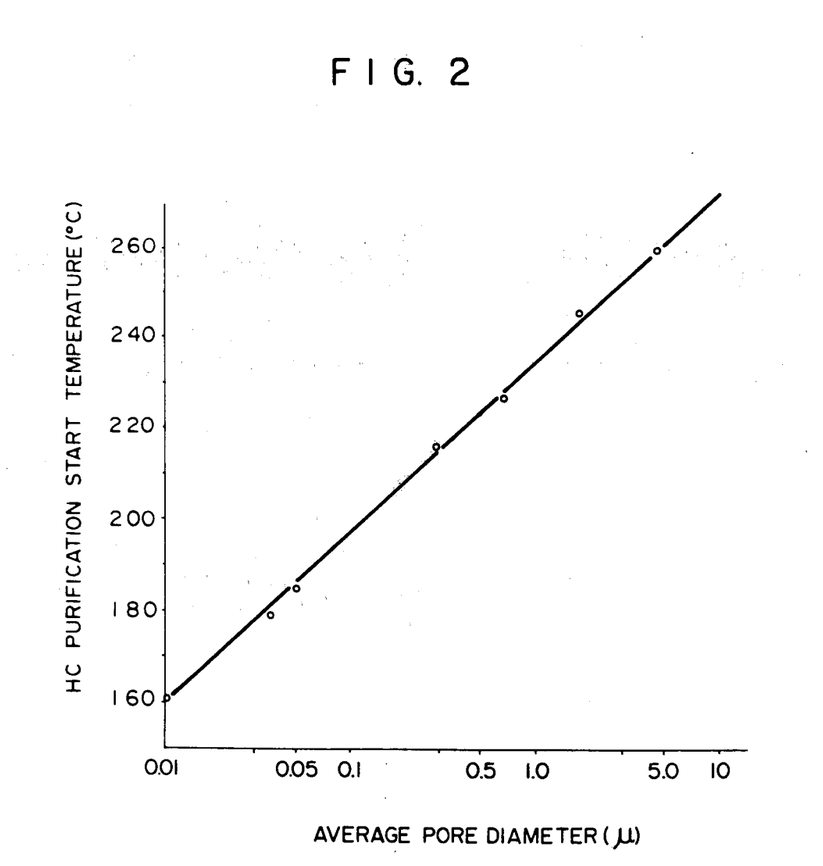
FIG. 2 shows the relation between the average pore diameter and the HC purification start temperature in a catalyst carried by the catalyst carrier according to the present invention.

In the catalyst reaction for auto exhaust gas purification CO purification can take place with relative ease at a higher rate than HC purification. Thus the most important factor in purification is the start temperature of HC purification which is deemed difficult to take place. For HC purification the lower the start temperature the better; but as far as the exhaust gas purification just after the engine starts is concerned, less than 260° C. is desirable and this temperature of less than 260° C. is practically feasible. From FIG. 2 illustrating the average pore diameter of the catalyst carrier according to the present invention vs. the HC purification start temperature of a catalyst carried by this carrier, it is known that the upper limit to the average pore diameter should be 5.0μ; and if the diameter is less than 5.0μ, the HC purification start temperature will be satisfactory; especially 0.08-0.35μ is most preferable.

A carrier made of the conventional active alumina has an average pore diameter of less than 0.05μ. If such a carrier is made to carry a precious metal as the catalyst by, say, an immersion method, the relation between the pore structure and the purifying performance of this catalyst will be as illustrated by a, b in Table 1 and the relation of the same precious metal catalyst carried by a carrier of the present invention with the average pore diameter in the range of 0.05-5.0μ will be as illustrated by c, d, e, f in Table 1.

Table 1

| | Pore structure of carrier | | | Durability of Catalyst Purification rate (%) | |
|---|---|---|---|---|---|
| | Average pore dia. | Total pore vol. | Specific surface area | | |
| Cases | (μ) | (cc/g) | (m²/g) | HC | CO |
| a | 0.01 | 0.62 | 70 | 61 | 73 |
| b | 0.03 | 1.05 | 90 | 65 | 75 |
| c | 0.08 | 0.50 | 55 | 82 | 93 |
| d | 0.25 | 0.23 | 20 | 95 | 98 |
| e | 1.2 | 0.12 | 4 | 93 | 99 |
| f | 3.5 | 0.30 | 11 | 84 | 90 |

The purification rate in Table 1 is a value measured from 10 modes in simulated 30,000 km-equivalent run on the table which has been carried out in accordance with a specified durability test pattern.

As evident from this Table, the purification rate of the catalyst carried by the conventional carriers a, b drops to about 60% for HC and about 70% for CO but in the cases c-f of the carrier according to the present invention being used, both the HC purification and the CO purification performances are maintained at high levels, pointing to the excellent durability of the catalyst carried by this carrier. Thus the average pore diameter is limited to a range of 0.05-5.0μ or preferably 0.1-2.0μ from the standpoint of durability and mechanical strength.

Figure 3:
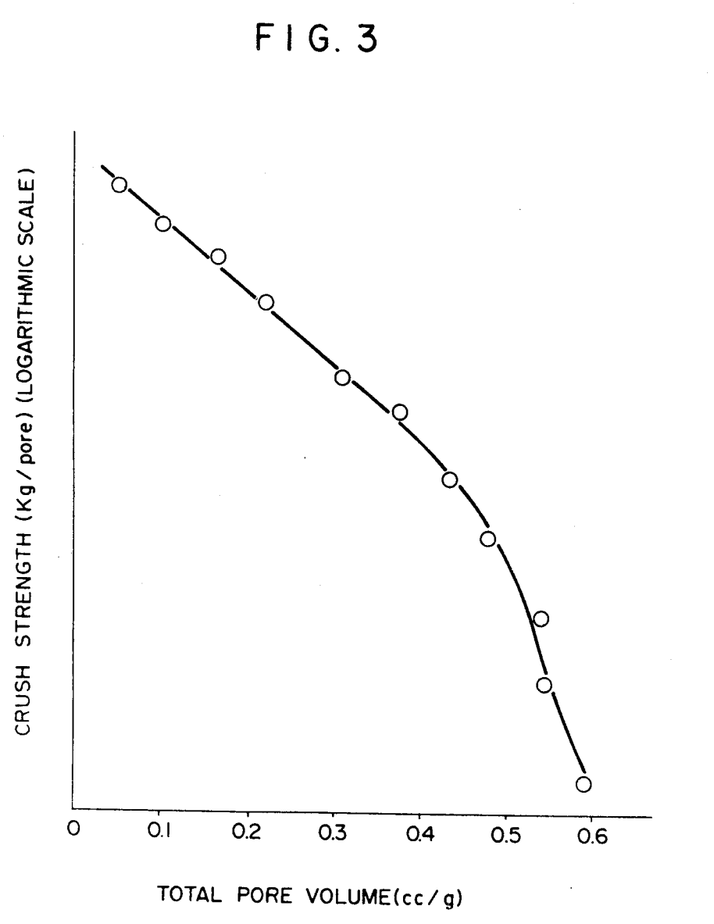
FIG. 3 shows the relation between the total pore volume and the crush strength of the catalyst carrier according to the present invention.

Meanwhile, as indicated by FIG. 3, the carrier becomes more porous with an increased total pore volume and in consequence its strength drops; but when the total pore volume exceeds 0.50 cc/g, the drop in its strength becomes heavy. However, when the total pore volume in the pore structure of the carrier is set at less than 0.50 cc/g, the carrier can maintain the necessary crush strength for auto exhaust gas purification catalyst and is practically useful.

Figure 4:
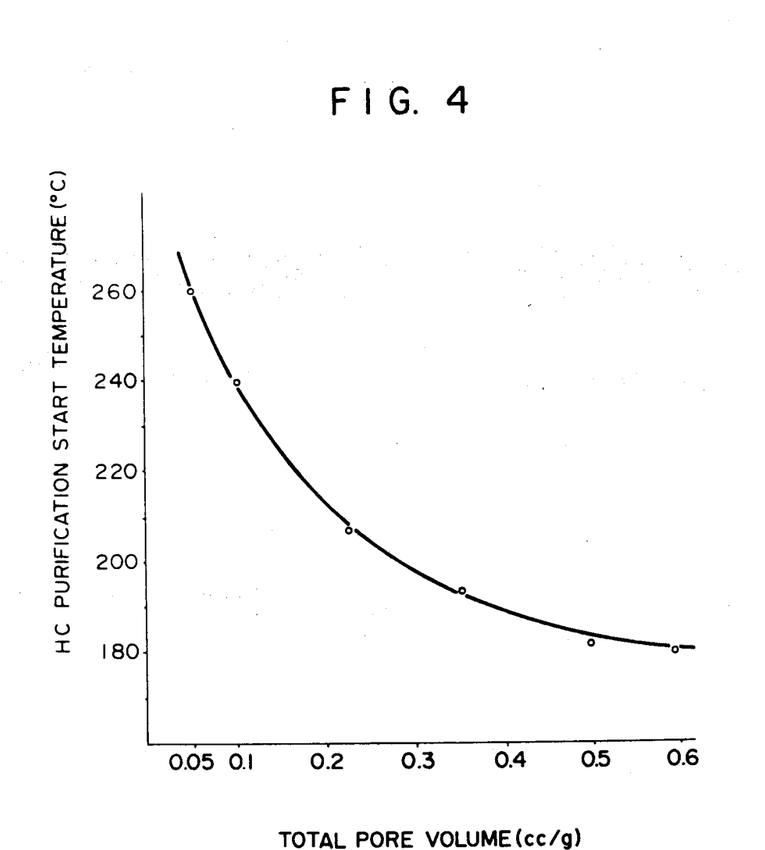
FIG. 4 shows the relation between the total pore volume and the HC purification start temperature in a catalyst carried by the catalyst carrier according to the present invention.

From FIG. 4 illustrating the total pore volume of the catalyst carrier according to the present invention vs. the HC purification start temperature of a catalyst carried by this carrier, it is seen that with a decrease in the total pore volume the carrier becomes dense with its porosity lost, and accordingly with the low-temperature reactivity reduced the HC purification start temperature rises. Namely, when the total pore volume is close to 0.05 cc/g, the HC purification start temperature reaches around 260° C.; and when said volume is less than 0.05 cc/g, the low-temperature reactivity is reduced, making the catalyst undesirable for auto exhaust gas purification. For this reason, the total pore volume should be more than 0.05 cc/g; and when the purifying performance and the mechanical strength of the catalyst are considered, the practical range of total pore volumes for the catalyst carrier would be preferably 0.05–0.50 cc/g or more preferably 0.10–0.35 cc/g.

Figure 5:
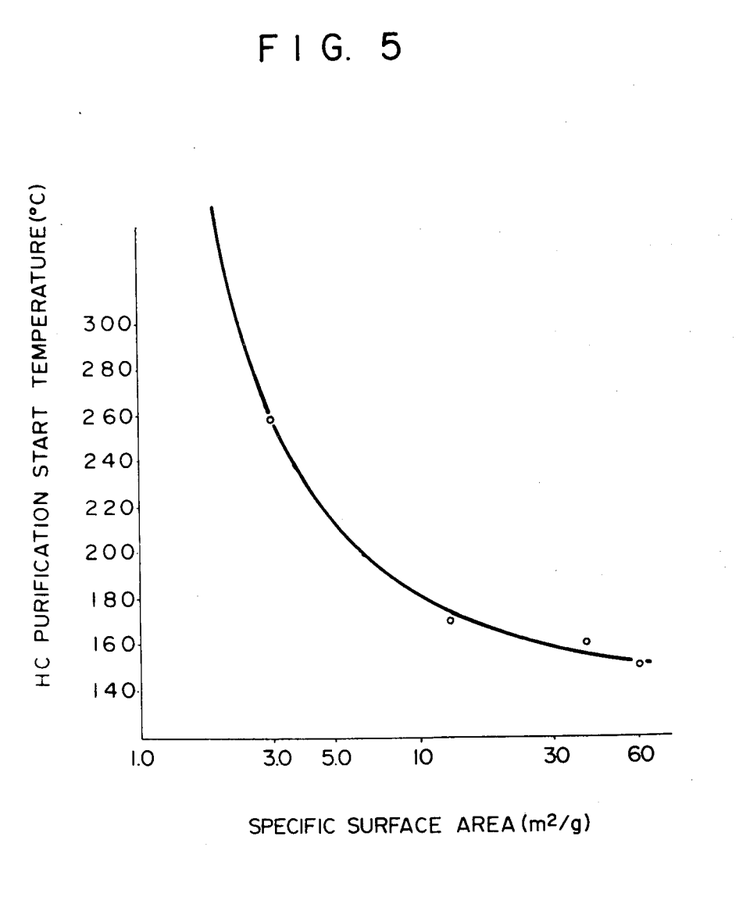
FIG. 5 shows the relation between the specific surface area and the HC purification start temperature in a catalyst carried by the catalyst carrier according to the present invention.
Figure 6:
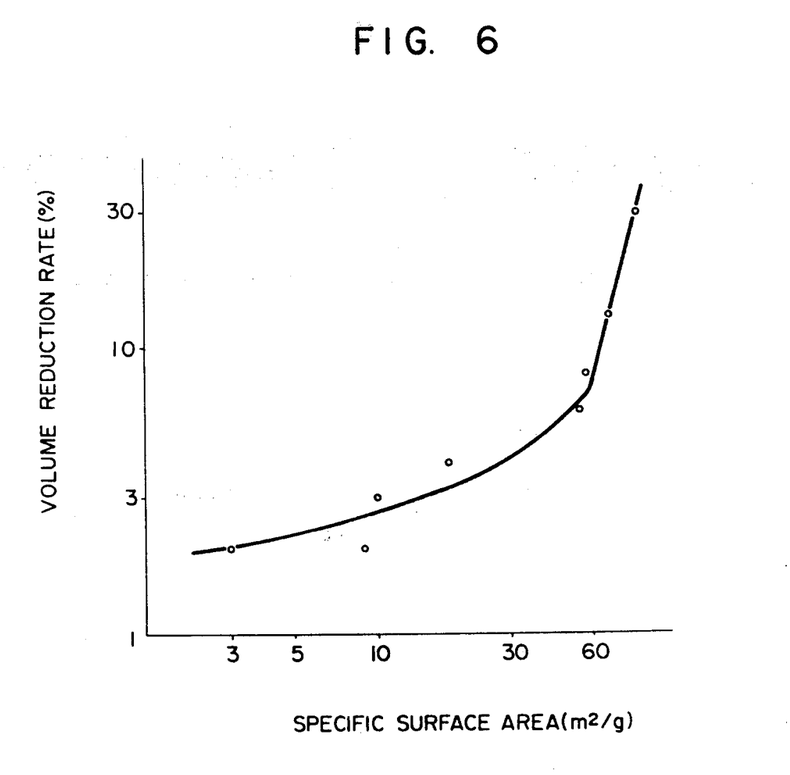
FIG. 6 shows the relation between the specific surface area and the volume decrease rate.

FIG. 5 illustrates the specific surface area of the catalyst carrier according to the present invention vs. the HC purification start temperature of a catalyst carried by this carrier. Therefrom it is known that for the HC purification start temperature to be below its practical value 260° C., the specific surface area should be more than 3 m²/g; and when the specific surface area exceeds 60 m²/g, the carrier surface has its mechanical strength reduced and becomes more liable to be pulverized by vibration, which is undesirable because of a heavy increase in the volume decrease rate as indicated in FIG. 6. Thus from the standpoint of catalyst performance and mechanical strength, the specific surface area should be 3–60 m²/g, or preferably 10–30 m²/g.

Since the above-mentioned porous material is exposed to a reactive fluid with a high space velocity such as the auto exhaust gas and put to use under heavy shock and vibration, it must have a sufficiently high crush strength as the carrier as well as an ability to purify the catalyst near the outer surface and accordingly for this purpose it must preferably have a double structure, i.e., sparse near the outer surface and dense in the core, so that the surface can have a large average pore diameter and a large total pore volume, while the core can have low values of them to maintain the mechanical strength.

It should be noted that use of the catalyst carrier according to the present invention is not confined to purification of auto exhaust gas.

Here are to be described the effects of the present invention referring to practical examples.

The carrier materials listed in Table 2 were wet-crushed in a ball mill. To 100 weight parts of the crushed material as dried, 20 parts of starch, 3 parts of crystal cellulose and 30 parts of water were added and fully mixed in a kneader. The mixture was squeezed into a column through a vacuum extruding machine; granulated to 2.8–3.4 mm in size by a rolling granulating machine; dried and then fired at 1250°–1400° C., thereby yielding the porous carrier specimens Nos. 1–10 listed in Table 2. Meanwhile, said materials were press-formed and fired at 1550° C., yielding compact sintered products. These products were crushed fine to 1.4–2.0 mm in size. These were mixed alternately with the above-mentioned crushed and dried carrier materials and with a 5% aqueous solution of alumina sol in a rolling granulating machine, yielding grains of 2.8–3.4 mm in size. The grains after dried were fired at 1250°–2400° C. to yield the specimens Nos. 11–13 of double structure, i.e., dense in the core and sparse near the surface, as listed in Table 2. The total pore volume and the average pore diameter of these specimens were measured by the mercury pressure method. The carrier materials thus obtained were immersed for 3–5 minutes in a saturated aqueous solution of aluminum nitrate; flushed with water for a short time after lifted out of the solution; dried and then heat-treated at 900° C., whereby the γ-alumina generated through decomposition of aluminum nitrate was deposited by baking on the internal surface of pores in the carrier material, thereby yielding the catalyst carrier according to the present invention. The characteristics of the catalyst carrier thus obtained are indicated in Table 2. Thereby the specific surface area was measured by the BET process. The operation of immersing in the saturated aqueous solution of aluminum nitrate, flushing with water and heat treatment was repeated until the desired specific surface area was attained.

One liter of each of these carrier materials was made to carry 1 g/l of Pt as the catalyst by the immersion method. The initial purification rate by standard gas and the durable purification rate of the catalysts thus obtained were measured from 10 modes of 30,000 km-equivalent simulated table run and the results are indicated for specimens Nos. 1–13 in Table 2. Also the volume decrease rate was measured. Meanwhile the values for the conventional transition alumina carrier, i.e., a, b in Table 1 are also given as specimens Nos. 14 and 15. Durable purifying performance is illustrated for specimen No. 1 i.e., the invented catalyst and for specimen No. 14, the conventional one in FIG. 1.

Table 2

| | | Carrier material characteristics | | | | Catalyst carrier characteristics | | | | Purification characteristics | | | | Volume* decrease Rate (%) |
|---|---|---|---|---|---|---|---|---|---|---|---|---|---|---|
| | | | Total pore volume (cc/g) | Average pore diameter (μ) | Density (g/cm³) | | Specific surface area (m²/g) | Total pore volume (cc/g) | Average pore diameter (μ) | Crush strength (Kg/particle) | CO purifying rate (%) | | HC purifying rate (%) | |
| Invented Product | Sample No. | Description | | | near surface | core | | | | | Initial | Durable | Initial | Durable | |
| | 1 | α-alumina | 0.18 | 0.35 | 3.03 | 3.03 | 10 | 0.15 | 0.35 | 31 | 97 | 94 | 95 | 93 | 2 |
| | 2 | α-alumina | 0.25 | 0.30 | 2.78 | 2.78 | 25 | 0.21 | 0.30 | 23 | 97 | 93 | 96 | 90 | 5 |
| | 3 | α-alumina | 0.15 | 0.35 | 3.15 | 3.15 | 9 | 0.14 | 0.35 | 31 | 96 | 86 | 95 | 83 | 2 |
| | 4 | α-alumina | 0.07 | 0.55 | 3.44 | 3.44 | 3 | 0.06 | 0.54 | 34 | 89 | 83 | 87 | 80 | 2 |
| | 5 | α-alumina | 0.54 | 0.06 | 1.70 | 1.70 | 58 | 0.50 | 0.06 | 18 | 95 | 93 | 95 | 89 | 8 |
| | 6 | α-alumina | 0.27 | 0.25 | 2.71 | 2.71 | 27 | 0.23 | 0.25 | 21 | 97 | 89 | 96 | 85 | 6 |
| | 7 | α-alumina | 0.14 | 1.2 | 2.75 | 2.75 | 8 | 0.12 | 1.2 | 34 | 95 | 84 | 90 | 80 | 2 |
| | 8 | zircon | 0.20 | 0.55 | 2.96 | 2.96 | 18 | 0.18 | 0.55 | 25 | 95 | 84 | 92 | 81 | 4 |
| | 9 | mullite | 0.17 | 0.80 | 2.41 | 2.41 | 15 | 0.15 | 0.80 | 35 | 93 | 85 | 90 | 82 | 4 |
| | 10 | cordierite | 0.28 | 4.8 | 1.83 | 1.83 | 30 | 0.23 | 4.8 | 20 | 87 | 85 | 86 | 82 | 7 |
| | 11 | α-alumina | 0.08 | 0.33 | 3.01 | 3.75 | 10 | 0.06 | 0.33 | 42 | 93 | 87 | 90 | 80 | 3 |
| | 12 | α-alumina | 0.10 | 0.08 | 2.87 | 3.75 | 48 | 0.08 | 0.08 | 46 | 96 | 85 | 94 | 83 | 2 |
| | 13 | mullite | 0.06 | 0.80 | 2.11 | 2.81 | 13 | 0.05 | 0.80 | 45 | 93 | 86 | 91 | 81 | 2 |
| Conventional Pro- | 14 | γ-alumina | — | — | — | — | 70 | 0.62 | 0.01 | 7 | 95 | 73 | 90 | 61 | 13 |
| | 15 | γ-alumina | — | — | — | — | 90 | 1.05 | 0.03 | 2.5 | 96 | 75 | 93 | 65 | 30 |

Table 2-continued

| | | Carrier material characteristics | | | | | Catalyst carrier characteristics | | | Purification characteristics | | | | Volume* decrease Rate (%) |
|---|---|---|---|---|---|---|---|---|---|---|---|---|---|---|
| | | | Total pore volume (cc/g) | Average pore diameter (μ) | Density (g/cm³) | | Specific surface area (m²/g) | Total pore volume (cc/g) | Average pore diameter (μ) | CO purifying rate (%) | | HC purifying rate (%) | | |
| Invented Product | Sample No. | Description | | | near surface | core | | | | Crush strength (Kg/particle) | Initial | Durable | Initial | Durable | |
| duct | | | | | | | | | | | | | | | |

*Volume decrease rate is a crushed volume in endurance test on the table.

As seen from Table 2 and FIG. 1, the catalyst according to the present invention suffers far less deterioration in the purification rate after endurance test than the conventional one. Thus the excellence of the catalyst according to the present invention in durability has been verified. With respect to the mechanical strength, the invented product far excels the conventional product in the crush strength. Also it has a very low rate of volume decrease and is least liable to crushing and surface abrasion.

Meanwhile, the invented product with such a large specific surface area of the catalyst carrier has given excellent results in the cold start test specified as one of the items in the auto exhaust gas measurement.

As described above, the catalyst carrier and catalyst according to the present invention are made of a refractory material with the internal surface of its pores deposited with an active alumina having a large specific surface area; and since the total pore volume, average pore diameter and specific surface area are optimized for auto exhaust gas purification, they are particularly superior in the purifying performance, mechanical strength and catalyst durability. Available for purification of auto and other exhaust gases, they are found very useful from an anti-pollution point of view.

What is claimed is:

1. Catalyst carrier comprising a porous refractory material having the internal surface of its pores deposited with an active alumina, in which said deposited carrier has a total pore volume of 0.05 –0.50 cc/g, an average pore diameter of 0.05 —5.0μ and a specific surface area of 3–60 m²/g.

2. The catalyst carrier of claim 1, wherein its total pore volume is 0.10–0.35 cc/g.

3. The catalyst carrier of claim 1, wherein its average pore diameter is 0.1–2.0μ.

4. The catalyst carrier of claim 1, wherein its specific surface area is 10–30 m²/g.

5. The catalyst carrier of claim 1, wherein said refractory material is selected from the group consisting of α-alumina, zircon, mullite, cordierite, or a compound which yields such a substance when fired.

6. The catalyst constituted by making the catalyst carrier of claim 1, carry a catalytic element.

7. The catalyst of claim 6, wherein said catalytic element is a platinum family metal.

8. The catalyst of claim 6 used for auto exhaust gas purification.

9. Manufacturing process of the catalyst carrier of claim 1, comprising:
    a step of preparing a porous carrier material;
    a step of immersing said material in aqueous solution of aluminum salt; and
    a step of drying it and heat-treating it, whereby the internal surface of the pores in said material is deposited with an active alumina and the step of immersing the carrier material in aqueous solution of aluminum salt and drying it is repeated until the desired total pore volume, average pore diameter and specific surface area is attained.

10. The manufacturing process of claim 9, wherein said refractory material is selected from the group consisting of α-alumina, zircon, mullite, cordierite or a compound which yields such a substance when fired.

11. The manufacturing process of claim 9, wherein more than 80% of said carrier material is a refractory material and less than 20% of it is a sintering agent.

12. The manufacturing process of claim 9, wherein the aluminum salt is aluminum nitrate.

* * * * *